(12) United States Patent
Morita

(10) Patent No.: US 10,756,943 B2
(45) Date of Patent: Aug. 25, 2020

(54) IMAGE FORMING SYSTEM, IMAGE FORMING APPARATUS, AND METHOD FOR CONTROLLING IMAGE FORMING SYSTEM

(71) Applicant: KYOCERA Document Solutions Inc., Osaka (JP)

(72) Inventor: Koichi Morita, Osaka (JP)

(73) Assignee: KYOCERA DOCUMENT SOLUTIONS INC., Osaka (JP)

(\*) Notice: Subject to any disclaimer, the term of this patent is extended or adjusted under 35 U.S.C. 154(b) by 117 days.

(21) Appl. No.: 15/879,817

(22) Filed: Jan. 25, 2018

(65) Prior Publication Data
US 2018/0219720 A1 Aug. 2, 2018

(30) Foreign Application Priority Data

Jan. 30, 2017 (JP) ................. 2017-014444

(51) Int. Cl.
*H04L 29/08* (2006.01)
*G06F 3/06* (2006.01)
(Continued)

(52) U.S. Cl.
CPC ...... *H04L 29/08117* (2013.01); *G06F 3/0646* (2013.01); *G06F 3/1207* (2013.01);
(Continued)

(58) Field of Classification Search
CPC ............. H04L 29/08117; H04L 63/168; H04L 63/0838; H04L 63/12; G06F 3/1207;
(Continued)

(56) References Cited

U.S. PATENT DOCUMENTS 6,493,110 B1\* 12/2002 Roberts .............. G06K 7/10851
235/462.01
7,577,901 B1\* 8/2009 Hull ...................... G06F 17/241
715/230
(Continued)

FOREIGN PATENT DOCUMENTS

JP 2004-157629 A 6/2004
JP 2007-47950 A 2/2007
(Continued)

OTHER PUBLICATIONS

Japanese Office Action dated Sep. 24, 2019, issued by the Japanese Patent Office in corresponding application JP 2017-014444.

*Primary Examiner* — David R Lazaro
*Assistant Examiner* — Berhanu Shitayewoldetadik
(74) *Attorney, Agent, or Firm* — Stein IP, LLC

(57) ABSTRACT

Provided is an image forming system including an image forming apparatus and a server. The server stores management data. The image forming apparatus accepts an instruction to print in a confidential mode. The image forming apparatus obtains a name of candidate receiver from the server. The image forming apparatus generates a code. The image forming apparatus prints a distribution material including the generated code and the name of candidate receiver corresponding to the generated code. The code is obtained by converting a URL of a site for receipt notification of the distribution material.

15 Claims, 12 Drawing Sheets

| ID | Name Of Person To Whom Distributed (Name Of Pupil) | Name Of Candidate Receiver (Name Of Guardian) | Grade | Class | Receipt Notification Record | Comment | Reference | Notification Date And Time |
|---|---|---|---|---|---|---|---|---|
| 0001 | Ito ○○ | Ito □□ | 1 | A | ○ | | aaa-bbbb-cccc | 20XX/XX/XX YY:YY:YY |
| 0002 | Kato ●● | Kato ■■ | 1 | A | | | dddd@eee.com | |
| ⋮ | ⋮ | ⋮ | ⋮ | ⋮ | ⋮ | ⋮ | ⋮ | ⋮ |
| 0100 | Sato ☆☆ | Sato ★★ | 1 | A | | | ffff@ggg.com hhh-iiii-jjjj | 20XX/XX/XX ZZ:ZZ:ZZ |
| ⋮ | ⋮ | ⋮ | ⋮ | ⋮ | ⋮ | ⋮ | ⋮ | ⋮ |
| 0200 | Fujita ◇◇ | Fujita ◆◆ | 1 | A | ○ | | KKKK@lll.com | |
| ⋮ | ⋮ | ⋮ | ⋮ | ⋮ | ⋮ | ⋮ | ⋮ | ⋮ |

Xx/Xx/20xx Distribution Material (Excursion)

(51) Int. Cl.
*H04L 29/06* (2006.01)
*G06F 3/12* (2006.01)

(52) U.S. Cl.
CPC .......... *G06F 3/1222* (2013.01); *G06F 3/1238* (2013.01); *G06F 3/1259* (2013.01); *G06F 3/1285* (2013.01); *G06F 3/1293* (2013.01); *H04L 63/0838* (2013.01); *H04L 63/12* (2013.01); *H04L 63/168* (2013.01)

(58) Field of Classification Search
CPC .... G06F 3/1259; G06F 3/1285; G06F 3/1222; G06F 3/1238; G06F 3/0646; G06F 3/1293
USPC ......................................................... 709/202
See application file for complete search history.

(56) References Cited

U.S. PATENT DOCUMENTS

| | | | | |
|---|---|---|---|---|
| 2002/0054333 | A1* | 5/2002 | Yamamoto | G06F 3/1253 358/1.15 |
| 2004/0128555 | A1* | 7/2004 | Saitoh | H04N 1/44 726/16 |
| 2005/0033658 | A1* | 2/2005 | Takeuchi | G06Q 30/0635 705/26.81 |
| 2005/0212904 | A1* | 9/2005 | Uejo | G06F 3/1206 347/248 |
| 2006/0103866 | A1* | 5/2006 | Saka | H04N 1/32657 358/1.13 |
| 2007/0153310 | A1* | 7/2007 | Jung | B41J 11/0065 358/1.12 |
| 2008/0163381 | A1* | 7/2008 | Inaba | G06F 21/31 726/28 |
| 2008/0204806 | A1* | 8/2008 | Tao | G06K 15/1851 358/1.16 |
| 2008/0265041 | A1* | 10/2008 | Brophy | G06K 19/06028 235/494 |
| 2010/0321718 | A1* | 12/2010 | Mihira | H04N 1/32657 358/1.14 |
| 2011/0069352 | A1* | 3/2011 | Yaguchi | G06F 3/1211 358/1.16 |
| 2011/0163169 | A1* | 7/2011 | Saldana | G06K 1/121 235/494 |
| 2011/0222115 | A1* | 9/2011 | Yamamoto | G03G 15/6582 358/1.15 |
| 2011/0273738 | A1* | 11/2011 | Tanaka | G06F 3/1258 358/1.14 |
| 2012/0038950 | A1* | 2/2012 | Tanaka | G06F 3/1211 358/1.15 |
| 2012/0075658 | A1* | 3/2012 | Yasui | G06F 3/1207 358/1.14 |
| 2012/0205436 | A1* | 8/2012 | Thomas | G06K 17/0025 235/375 |
| 2012/0293820 | A1* | 11/2012 | Mizoguchi | G06F 3/1271 358/1.13 |
| 2013/0033721 | A1* | 2/2013 | Miyamoto | G06F 3/1285 358/1.14 |
| 2013/0094053 | A1* | 4/2013 | Shirai | G06F 3/1222 358/1.15 |
| 2014/0043624 | A1* | 2/2014 | Wang | G06F 3/1247 358/1.8 |
| 2014/0098398 | A1* | 4/2014 | Hobbs | G06F 3/1219 358/1.15 |
| 2014/0222948 | A1* | 8/2014 | Terasawa | G06F 13/00 709/213 |
| 2015/0092233 | A1* | 4/2015 | Park | G06F 3/1288 358/1.15 |
| 2015/0146259 | A1* | 5/2015 | Enomoto | H04N 1/32112 358/1.16 |
| 2017/0075635 | A1* | 3/2017 | Maemura | H04N 1/00244 |

FOREIGN PATENT DOCUMENTS

| | | |
|---|---|---|
| JP | 2007-159068 A | 6/2007 |
| JP | 2013-245060 A | 12/2013 |

* cited by examiner

FIG.3

| ID | Name Of Person To Whom Distributed (Name Of Pupil) | Name Of Candidate Receiver (Name Of Guardian) | Xx/Xx/20xx Distribution Material (Excursion) | | | | | |
|---|---|---|---|---|---|---|---|---|
| | | | Grade | Class | Receipt Notification Record | Comment | Reference | Notification Date And Time |
| 0001 | Ito ○○ | Ito □□ | 1 | A | ○ | | aaa-bbbb-cccc | 20XX/XX/XX YY:YY:YY |
| 0002 | Kato ● | Kato ■ | 1 | A | | | dddd@eee.com | |
| ... | ... | ... | ... | ... | ... | ... | ... | ... |
| 0100 | Sato ☆☆ | Sato ★★ | 1 | A | | | ffff@ggg.com<br>hhh-iiii-jjjj | 20XX/XX/XX ZZ:ZZ:ZZ |
| ... | ... | ... | ... | ... | ... | ... | ... | ... |
| 0200 | Fujita ◇◇ | Fujita ◆ | 1 | A | ○ | | KKKK@lll.com | ... |
| ... | ... | ... | ... | ... | ... | ... | ... | ... |
| 41 | 42 | 43 | 44 | 45 | 46 | 47 | 48 | 49 |

FIG.12

Distribution Material Management Menu

| Document ID | Print Date | Title Of Distribution Material | Distribution Target |
|---|---|---|---|
| 1000 | 20XX/XX/XX | Annual Event | All Grades |
| 1001 | 20XX/AA/BB | Purchase Of Teaching Material | Grade 2 Class |
| 1002 | 20XX/CC/DD | Class Observation | Grade 1 All Classes |
| 1003 | 20XX/EE/FF | Excursion | Grade 2 All Classes |
| 1004 | 20XX/GG/HH | Volunteer Activity | Grade 3 Class B |

(Target) Grade [All] ▼ — m3    Class [All] ▼ — m4

Inquiry — B6

Status List Print — B7

Date And Time List Print — B8

Cancel    OK

| | | | | | 91 |
|---|---|---|---|---|---|
| XX/XX/20XX Distribution Material (Excursion) | | | | | |
| Grade | Class | Name Of Candidate Receiver (Name Of Guardian) | Name Of Person To Whom Distributed (Name Of Pupil) | Receipt Notification | |
| 1 | A | Ito Yota | Ito Ryo | ○ | |
| 1 | A | Kato Aoi | Kato Yoko | ○ | |
| 1 | A | Sato Riku | Sato Toru | ○ | |
| 1 | A | Suzuki Sakura | Suzuki Mai | | |
| 1 | A | Takahasi Ren | Takahasi Yu | ○ | |
| 1 | A | Hara Yui | Hara Rie | ○ | |
| 1 | A | Matsumoto Futa | Matsumoto Koji | ○ | |
| 1 | A | Yamamoto Rin | Yamamoto Emi | | |
| 44 | 45 | 42 | 43 | 46 | |

FIG.16

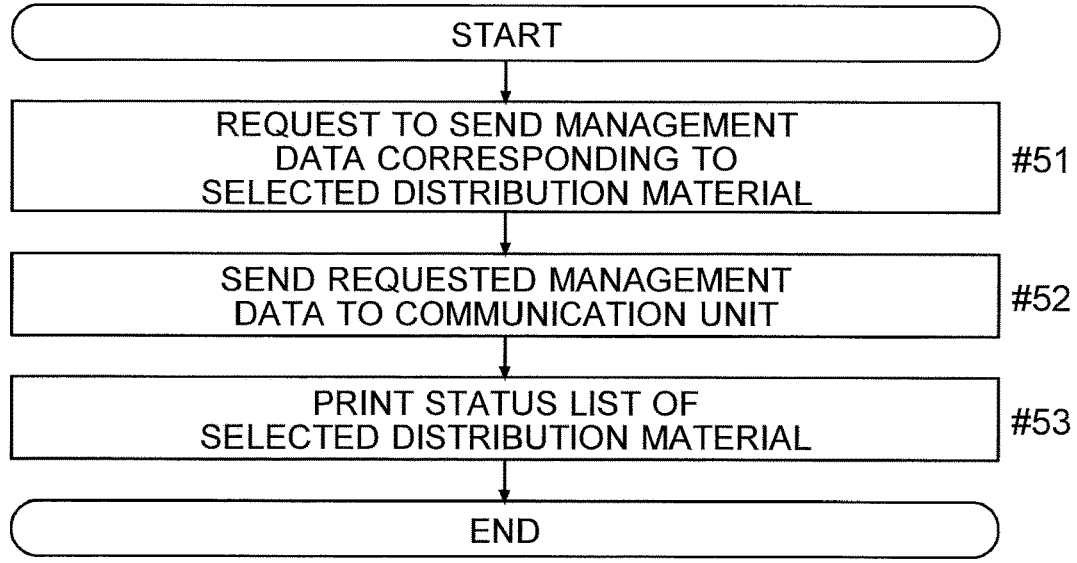

FIG.17

| | | | | 92 |
|---|---|---|---|---|
| XX/XX/20XX Distribution Material (Excursion) ||||||
| Grade | Class | Name Of Candidate Receiver (Name Of Guardian) | Name Of Person To Whom Distributed (Name Of Pupil) | Receipt Notification |
| 1 | A | Ito Yota | Ito Ryo | 20XX/XX/XX aa:aa:aa |
| 1 | A | Kato Aoi | Kato Yoko | 20XX/XX/XX bb:bb:bb |
| 1 | A | Sato Riku | Sato Toru | 20XX/XX/XX cc:cc:cc |
| 1 | A | Suzuki Sakura | Suzuki Mai | |
| 1 | A | Takahasi Ren | Takahasi Yu | 20XX/XX/XX dd:dd:dd |
| 1 | A | Hara Yui | Hara Rie | 20XX/XX/XX ee:ee:ee |
| 1 | A | Matsumoto Futa | Matsumoto Koji | 20XX/XX/XX ff:ff:ff |
| 1 | A | Yamamoto Rin | Yamamoto Emi | |
| 44 | 45 | 42 | 43 | 49 |

IMAGE FORMING SYSTEM, IMAGE FORMING APPARATUS, AND METHOD FOR CONTROLLING IMAGE FORMING SYSTEM

INCORPORATION BY REFERENCE

This application is based upon and claims the benefit of priority from the corresponding Japanese Patent Application No. 2017-014444 filed Jan. 30, 2017, the entire contents of which are hereby incorporated by reference.

BACKGROUND

The present disclosure relates to an image forming system that prints a distribution material and manages whether or not the printed distribution material is received by a person who should receive it.

In events such as wedding ceremony, it is necessary to manage invitees and attendees. For example, an invitation card is sent to selected invitees. On the basis of attendance/absence replies to the invitation card, attendees are determined. On the day of the event, actual attendance of expected attendees is checked. There are many occasions in which attendance/absence is checked. Attendance/absence management work is complicated. Accordingly, the following technique for simplifying the event attendance/absence management work is known as an example.

Specifically, there is known an event information processing apparatus, which stores event identification information for identifying event and invitee information including at least invitee identification information for identifying invitees of each event in association with each other, issues attendance/absence identification information that can be read by predetermined reading means and includes invitee identification information and attendance identification information indicating intention to attend the event or absence identification information indicating intention to be absent, and prints the issued attendance/absence identification information on a post card to be sent to invitees. With this structure, it is intended to facilitate checking attendance/absence information of invitees.

Distribution material may be distributed via persons. For example, in a school, a distribution material (printed matter) is distributed to pupils. Communication matters and event information for guardians are described on the distribution material. The pupil who receives the distribution material hands (shows) the printed matter to his/her guardian after coming home.

There may be a case where some persons who should receive the distribution material do not receive the distribution material. For example, the distribution material (printed matter) may be lost. In another case, the distribution material may be thrown away by mistake. In another case, a person may forget to hand the distribution material to a person who should receive it. When the person to whom distributed is a child such as an elementary school pupil, there are not a few cases where the person forgets to hand the distribution material to his/her guardian. In this case, the communication or information is not given to the person who should receive. In some cases, a problem may occur.

It is desirable to enable to check whether or not the distribution material is received by the person who should receive it. However, the distributing party cannot know who has received the distribution material and who has not among persons who should receive. Therefore, in order to completely check reception status, it is necessary for the distributing party to directly inquire every person who should receive. For example, means such as telephone or electric mail are used. There is a problem that it requires large effort to confirm reception of the distribution material.

The known technique described above may simplify the attendance/absence check work of invitees of an event. However, it is not possible to check whether or not the distribution material is received by the person who should receive it. In addition, when there is no reply from the invitee, a case where the invitation card is not received and a case where the invitee forgets to reply cannot be distinguished from each other. Therefore, the above-mentioned problem cannot be solved.

SUMMARY

An image forming system according to the present disclosure includes an image forming apparatus and a server. The server stores management data defining a name of person to whom distributed and a name of candidate receiver. The name of person to whom distributed is a name of a person to whom a distribution material is distributed. The name of candidate receiver is a name of a person who should receive the distribution material via the person to whom distributed. The image forming apparatus accepts an instruction to print in the confidential mode. The image forming apparatus makes a communication unit obtain the name of candidate receiver from the server. The image forming apparatus stores the obtained name of candidate receiver. When the instruction to print in the confidential mode is made, the image forming apparatus generates a code that can be decoded by a communication device. The image forming apparatus prints the distribution material including the generated code and the name of candidate receiver corresponding to the generated code. The code is obtained by converting a URL of a receipt notification site. The receipt notification site is a site disposed in the server, and is a site for notifying that the candidate receiver of the distribution material has actually received the distribution material.

Further features and advantages of the present disclosure will become apparent from the description of embodiments given below.

BRIEF DESCRIPTION OF THE DRAWINGS

FIG. 3 is a diagram showing an example of management data according to the embodiment.

FIG. 12 is a diagram showing an example of a distribution material management menu screen according to the embodiment.

FIG. 15 is a diagram showing an example of the printed status list.

FIG. 16 is a flowchart showing an example of a flow of printing a notification date and time list in the image forming system according to the embodiment.

FIG. 17 is a diagram showing an example of the printed notification date and time list.

DETAILED DESCRIPTION

The present disclosure enables to easily check whether or not a distribution material is received by a person who should receive it. It prevents information transmission failure. Hereinafter, with reference to FIGS. 1 to 17, an embodiment of the present disclosure is described. In this description, an image forming system 100 including a multifunction peripheral 1 (corresponding to an image forming apparatus) and a server 2 is exemplified and described. However, elements such as structures and arrangements described in this embodiment are merely examples and do not limit the scope of the disclosure.

Schematic Structure of Image Forming System 100

Figure 1:
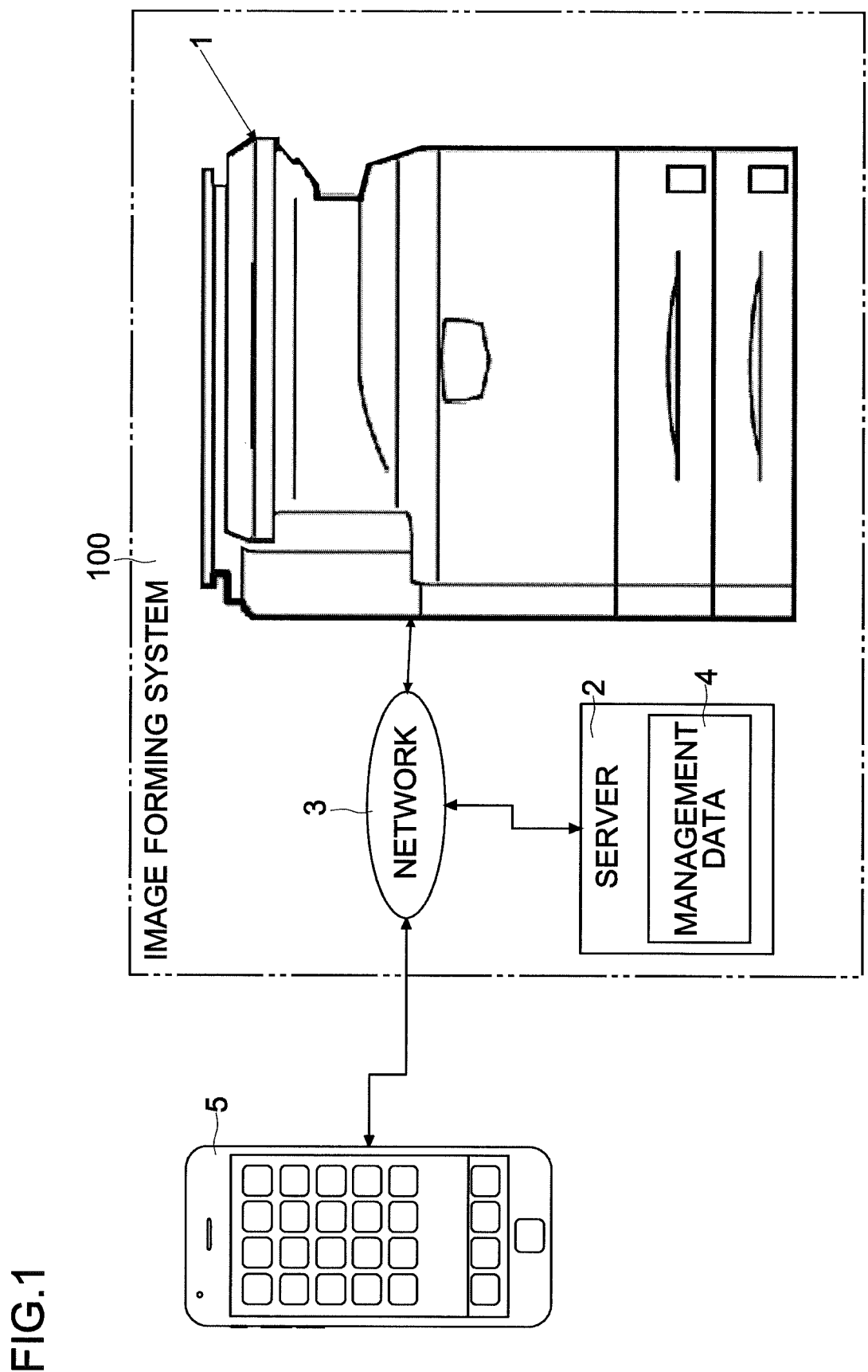
FIG. 1 is an explanatory diagram showing an example of an image forming system according to an embodiment.
Figure 2:
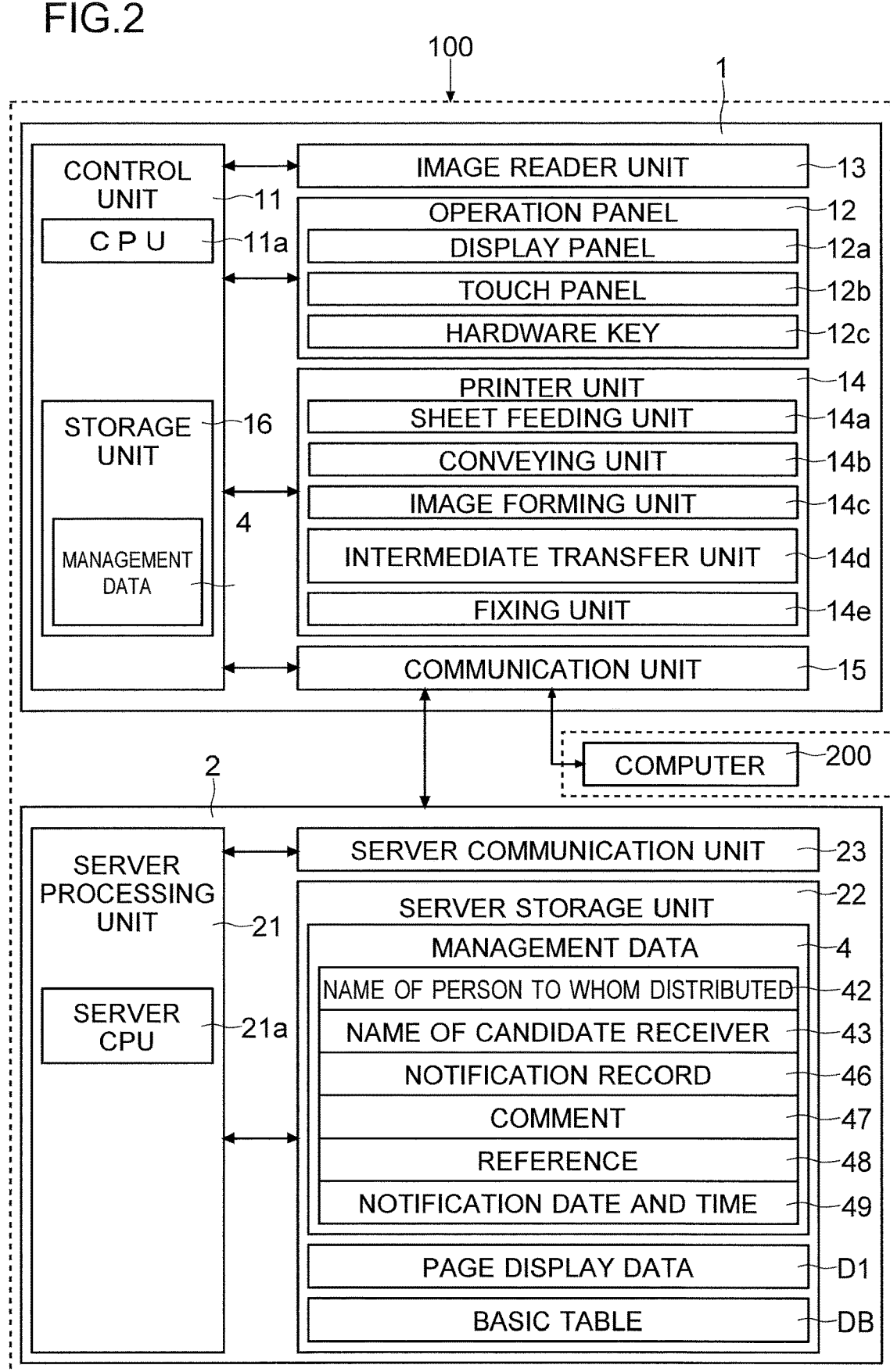
FIG. 2 is an explanatory diagram showing an example of the image forming system according to the embodiment.

First, with reference to FIGS. 1 and 2, an example of a schematic structure of the image forming system 100 according to the embodiment is described. The multifunction peripheral 1 can be used for printing a distribution material P (printed matter for distribution). The distribution material P is checked by a candidate receiver (person who should receive) via a person to whom distributed. For example, the distribution material P is a printed matter for guardians distributed to pupils of a school. The pupil corresponds to the person to whom distributed. The candidate receiver is a guardian (parent) of the pupil. Note that the multifunction peripheral 1 can be used also for printing a document other than the distribution material P (for normal printing).

The image forming system 100 includes the server 2. The server 2 can communicate with the multifunction peripheral 1 via a network 3. The server 2 stores management data 4. The management data 4 is data for managing whether or not the distribution material P is received by the candidate receiver. Note that the server 2 may be disposed in the multifunction peripheral 1.

A communication device 5 owned by the candidate receiver can access the server 2. The communication device 5 shown in FIG. 1 is a smartphone. The communication device 5 is not limited to the smartphone. The communication device 5 may be other type of device (such as a PC or a tablet computer) that can communicate with the server 2 via the network 3.

As shown in FIG. 2, the multifunction peripheral 1 includes a control unit 11, an operation panel 12, an image reader unit 13, a printer unit 14, and a communication unit 15. The control unit 11 controls operation of the multifunction peripheral 1. The control unit 11 includes a CPU 11a and a storage unit 16. The storage unit 16 is a combination of devices such as a ROM, a RAM, and an HDD. The storage unit 16 stores data such as control data for the multifunction peripheral 1, setting data, and image data, and a control program. The CPU 11a controls individual units of the multifunction peripheral 1 (the operation panel 12, the image reader unit 13, the printer unit 14, and the communication unit 15) based on the control program and the control data stored in the storage unit 16.

In a job (copying or transmission), the control unit 11 controls the image reader unit 13 to read a document. The image reader unit 13 includes optical members (not shown) such as an exposure lamp, a mirror, a lens, and an image sensor. When reading a document, the control unit 11 controls the image reader unit 13 to illuminate the document and to receive reflected light from the document with the image sensor. The image reader unit 13 generates image data of the document based on an output of each pixel of the image sensor.

The operation panel 12 includes a display panel 12a, a touch panel 12b, and a hardware key 12c. The control unit 11 controls the display panel 12a to display setting screens and images for operation according to operations by a user. The touch panel 12b detects an operation to the image for operation displayed on the display panel 12a. The hardware key 12c includes a start key for instructing to start a job. An output of the touch panel 12b and an output signal of the hardware key 12c are input to the control unit 11. The control unit 11 recognizes content of the operation with the operation panel 12 based on a signal from the operation panel 12.

The printer unit 14 includes a sheet feeding unit 14a, a conveying unit 14b, an image forming unit 14c, an intermediate transfer unit 14d, and a fixing unit 14e. In a job accompanied with printing, the control unit 11 controls the sheet feeding unit 14a to feed a paper sheet. The control unit 11 controls the conveying unit 14b to convey the paper sheet along a conveying path in the apparatus. The control unit 11 controls the image forming unit 14c to form a toner image based on image data of the image to be formed. The control unit 11 controls the intermediate transfer unit 14d to transfer the toner image. The toner image is transferred onto the conveyed paper sheet. The control unit 11 controls the fixing unit 14e to fix the transferred toner image to the paper sheet.

The communication unit 15 receives print data transmitted from a computer 200. The print data is image data or data described in a page description language. The control unit 11 controls the printer unit 14 to perform printing based on the print data received from the computer 200 (print job).

The communication unit 15 can communicate with the server 2 via the network 3 by wireless or wired means. The control unit 11 controls the communication unit 15 to obtain (download) the management data 4 stored in the server 2. The control unit 11 controls the storage unit 16 to store the management data 4 obtained by the communication unit 15.

Next, the server 2 is described. The server 2 includes a server processing unit 21, a server storage unit 22, and a server communication unit 23. The server processing unit 21 (server control board) includes a server CPU 21a. The server storage unit 22 includes an HDD, a RAM, and a ROM. The server communication unit 23 communicates with the multifunction peripheral 1 and the communication device 5 via the network 3.

The server storage unit 22 stores the management data 4. The server 2 stores page display data D1. The page display data D1 is data for displaying a web page on a display of the communication device 5 responding to an access from the communication device 5 of the candidate receiver (guardian).

Management Data 4

Next, with reference to FIG. 3, the management data 4 according to the embodiment is described. The multifunction peripheral 1 (image forming system 100) has a confidential mode. The confidential mode is a printing mode for managing whether or not the distribution material P (printed matter) is received by the guardian (candidate receiver). The distribution material P (document) from a school (teacher) to the guardian can be printed in the confidential mode. As the distribution material, for example, there are a notice of class observation, a notice about collection of money, and a notice of an event. When using the confidential mode, a confidential mode button B1 (see FIG. 5) displayed on the display panel 12*a* is operated (details will be described later). The management data 4 generated in the server 2 is used for printing in the confidential mode.

The management data 4 has a structure like a table. The management data 4 is one type of relational database. FIG. 3 shows an example of the management data 4 that is used in a school. Specifically, FIG. 3 shows an example of the management data 4 corresponding to the distribution material P of "excursion" printed on date XX/XX/20XX.

As shown in FIG. 3, the management data 4 has items of an ID 41, a name of person to whom distributed 42 (name of pupil), a name of candidate receiver 43 (name of guardian), a grade of person to whom distributed 44, a class of person to whom distributed 45, a receipt notification record 46, a comment 47, a reference 48, and notification date and time 49. In the management data 4 (table) of FIG. 3, one row data include data of the items for one person to whom distributed (one home).

The ID 41 is an organizing number assigned to each person to whom distributed (each pupil). The name of person to whom distributed 42 (name of pupil) is a name of a person such as a pupil whom the distribution material P is distributed. The name of candidate receiver 43 (name of guardian) is a name of a person such as a parent who protects the pupil and should receive the distribution material P. The receipt notification record 46 indicates presence or absence of receipt notification from the candidate receiver corresponding to the person to whom distributed. The receipt notification record 46 is a record whether or not the server 2 has received the receipt notification of the distribution material P from the candidate receiver. The comment 47 includes a comment received from the receiver of the distribution material P. The comment 47 is comment data attached to the receipt notification. The reference 48 is a reference of the candidate receiver of the distribution material P. The notification date and time 49 indicates date and time when the server 2 received the receipt notification.

The management data 4 can be generated for each type of the distribution material P. For example, when the distribution material P is printed in the confidential mode, the server processing unit 21 automatically generates the management data 4 according to notification from the multifunction peripheral 1 in which the confidential mode is set (details will be described later). The server processing unit 21 stores the generated management data 4 in the server storage unit 22.

For example, the server storage unit 22 stores a basic database (basic table DB) containing the ID 41, the name of person to whom distributed 42, the name of candidate receiver 43, the grade 44, the class 45, and the reference 48 of all pupils of the school. When generating the management data 4, the server processing unit 21 extracts from the basic table DB the ID 41, the name of person to whom distributed 42, the name of candidate receiver 43, the grade 44, the class 45, and the reference 48 of persons to whom the distribution material P should be distributed. Further, the server processing unit 21 generates the management data 4 by adding items (fields) of the receipt notification record 46, the comment 47, and the notification date and time 49 to the extracted data.

Communication Device 5

Figure 4:
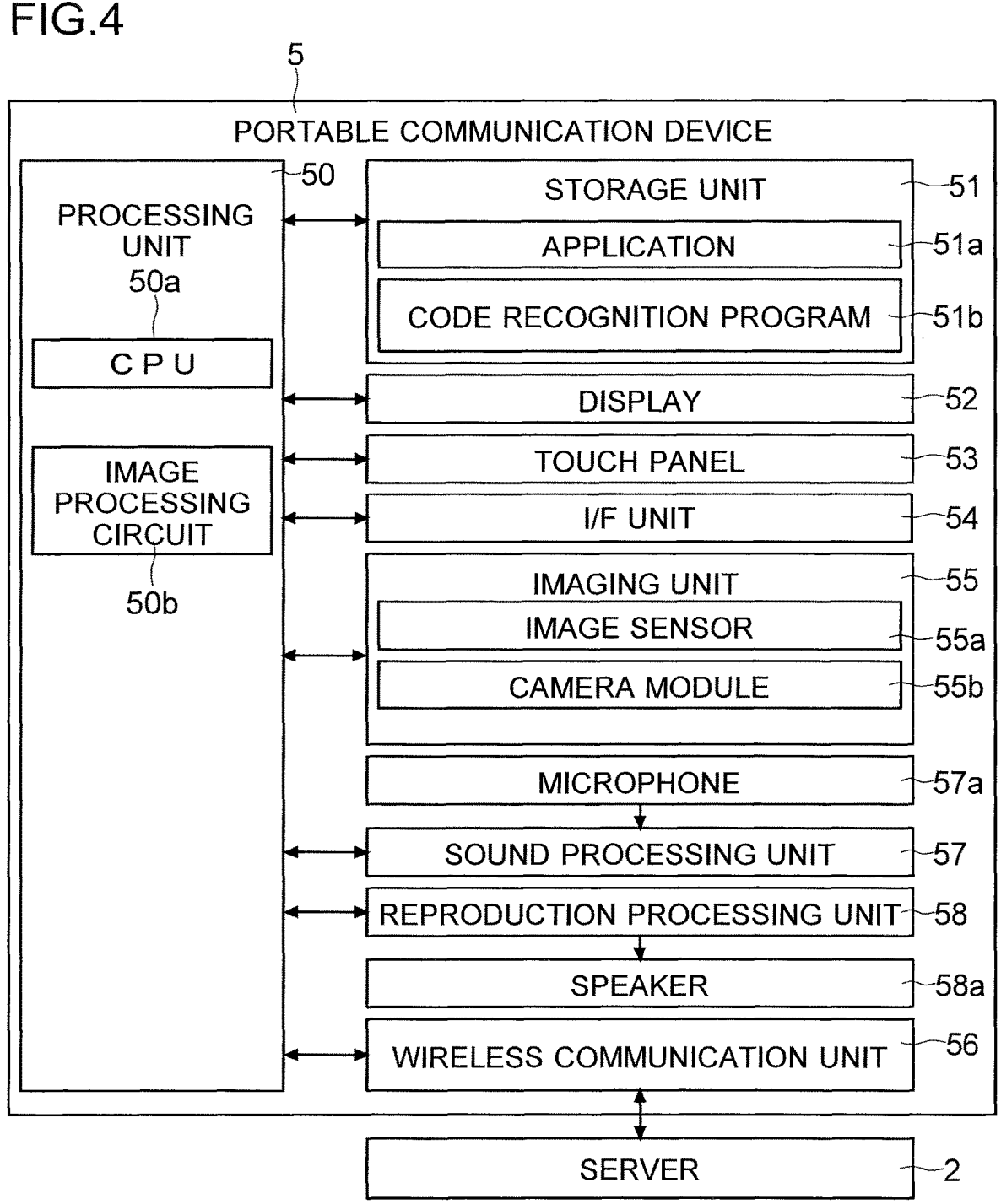
FIG. 4 is a diagram showing an example of a communication device according to the embodiment.

Next, with reference to FIG. 4, an example of the communication device 5 that is used when the candidate receiver accesses the server 2 is described. The communication device 5 includes a processing unit 50, a storage unit 51, a display 52, a touch panel 53, an I/F unit 54, an imaging unit 55, a sound processing unit 57, a microphone 57*a*, a reproduction processing unit 58, a speaker 58*a*, and a wireless communication unit 56. The storage unit 51 includes a ROM, a RAM, and a flash memory.

The processing unit 50 is a circuit that controls operation of the communication device 5. The processing unit 50 includes a CPU 50*a* and an image processing circuit 50*b*. A single chip integrated circuit in which the CPU 50*a* and the image processing circuit 50*b* are integrated can be used as the processing unit 50. The CPU 50*a* controls operation of the communication device 5 based on an OS, a program, an application 51*a*, and data of the communication device 5. The image processing circuit 50*b* performs image processing on the image data.

The storage unit 51 stores various data such as control data and image data, a control program, and the application 51*a* of the communication device 5. The processing unit 50 controls individual portions of the communication device 5 according to the control program, the control data, and the application 51*a* stored in the storage unit 51. The user requests to start the user application 51*a* via the touch panel 53. The processing unit 50 reads the application 51*a* from the storage unit 51 responding to the request to start. The processing unit 50 executes the read application 51*a*.

The display 52 displays various information according to a request from the processing unit 50. The display 52 is a panel such as a liquid crystal panel or an organic EL panel. The touch panel 53 is connected to the processing unit 50. The processing unit 50 recognizes a touched position based on an output of the touch panel 53. The processing unit 50 recognizes a touched object among icons, buttons, and keys displayed on the display 52. By pressing an icon, a button, or a key, the user can start the application 51*a*, can use the same, or can call the telephone.

The I/F unit 54 includes a connector, a socket, and a communication chip based on various standards. A storage medium such as a memory card is inserted into the I/F unit 54. The I/F unit 54 reads data from the storage medium and writes data to the storage medium.

The imaging unit 55 is a camera mounted in the communication device 5. The imaging unit 55 includes a lens, an image sensor 55*a*, and a camera module 55*b*. The camera module 55*b* generates picture image data based on a signal output from the image sensor 55*a*. The application 51*a* for imaging with the imaging unit 55 is stored in the storage unit 51. The picture image data obtained by imaging with the imaging unit 55 is stored in the storage unit 51. On the basis of image data of a code 6 imaged with the imaging unit 55, the processing unit 50 recognizes a URL contained in the code 6 (details will be described later). A code recognition program 51b for decoding the code 6 is stored in the storage unit 51.

The wireless communication unit 56 includes an antenna and a communication circuit. The wireless communication unit 56 can access a data communication line and a telephone line responding to an instruction from the processing unit 50. Via the wireless communication unit 56, transmission and reception of data as well as phone call can be performed with outside. The communication device 5 can access the server 2 using the wireless communication unit 56.

The sound processing unit 57 performs signal processing on sound input from the microphone 57a into a format that can be transmitted from the wireless communication unit 56. The reproduction processing unit 58 allows the speaker 58a to reproduce sound data of the other party received by the wireless communication unit 56.

Printing of Distribution Material P in Confidential Mode

Figure 5:
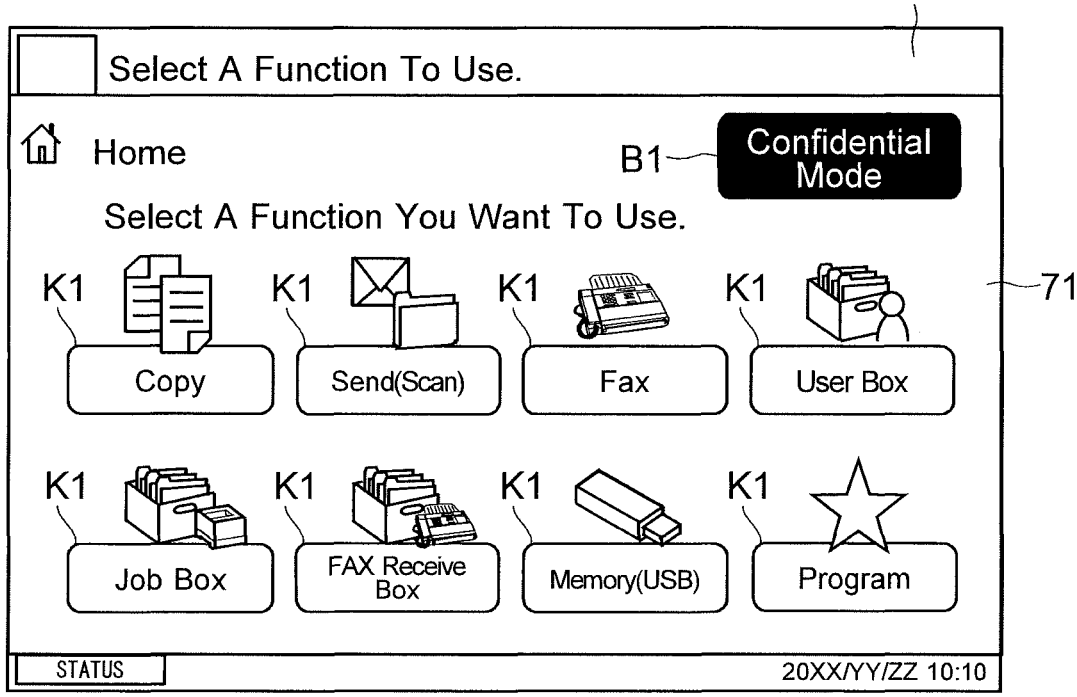
FIG. 5 is a diagram showing an example of a home screen of a multifunction peripheral according to the embodiment.

Next, with reference to FIGS. 5 to 9, a flow of printing of the distribution material P in the confidential mode according to the embodiment is described. The confidential mode button B1 is displayed on the display panel 12a. By operating the confidential mode button B1, the confidential mode can be used. The multifunction peripheral 1 can perform jobs such as copying and transmission. FIG. 5 shows an example of a home screen 71 for selecting a type of the job. The confidential mode button B1 can be displayed on the home screen 71. The operation panel 12 (touch panel 12b) accepts an operation to the confidential mode button B1. The control unit 11 recognizes that the confidential mode is selected. The confidential mode button B1 may be displayed on a screen other than the home screen 71. For example, the confidential mode button B1 may be displayed on each setting screen that is displayed when operating a button for selecting a job such as copying related to printing.

Figure 6:
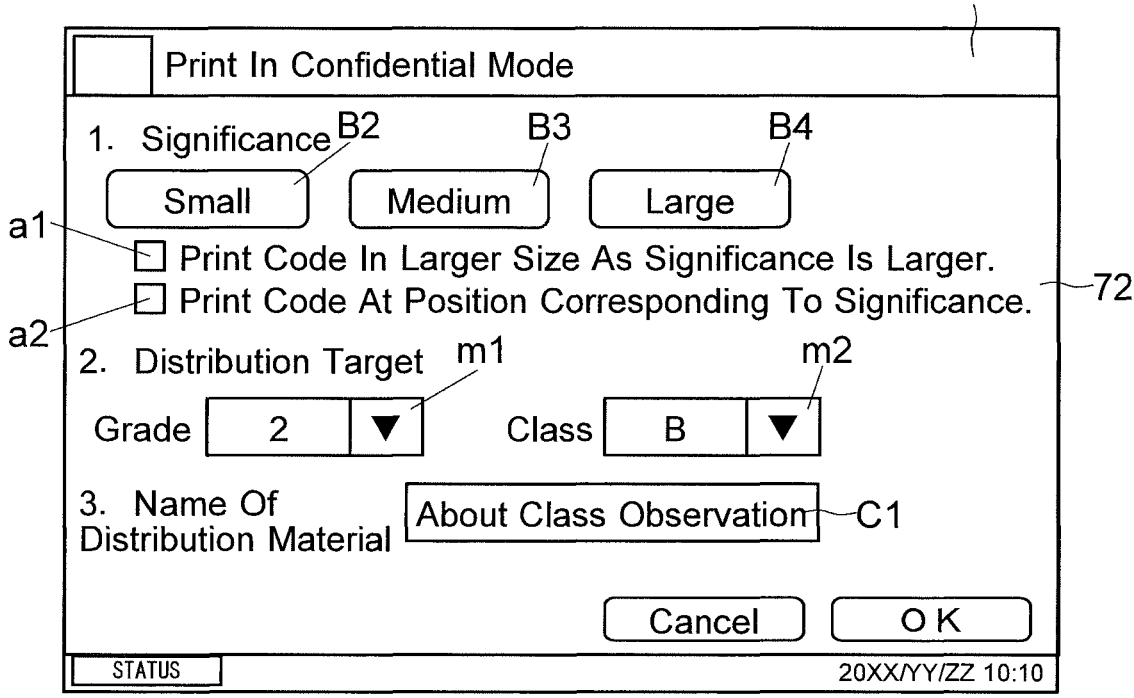
FIG. 6 is a diagram showing an example of a confidential mode setting screen according to the embodiment.

When the confidential mode button B1 is operated, the control unit 11 controls the display panel 12a to display a confidential mode setting screen 72. The confidential mode setting screen 72 is a screen for setting about printing in the confidential mode. As shown in FIG. 6, the confidential mode setting screen 72 is provided with buttons for setting significance of the distribution material P to be printed in the confidential mode. As the buttons for setting significance, there are a "small" button B2, a "medium" button B3, and a "large" button B4. When significance of the distribution material P to be printed is large, the user operates the "large" button B4. When significance of the distribution material P to be printed is a medium degree, the user operates the "medium" button B3. When significance of the distribution material P to be printed is not so large, the user operates the "small" button B2. In this way, the operation panel 12 accepts setting of significance of the distribution material P to be printed. The control unit 11 recognizes the set significance.

The confidential mode setting screen 72 is provided with a pull-down menu for setting a distribution target of the distribution material P to be printed in the confidential mode. FIG. 6 shows an example in which the confidential mode setting screen 72 is provided with a first pull-down menu m1 and a second pull-down menu m2. The first pull-down menu m1 is a menu for setting the grade 44 of pupils to whom the distribution material P is distributed. The second pull-down menu m2 is a menu for setting the class 45 of pupils to whom the distribution material P is distributed. When each pull-down menu is touched, the control unit 11 controls the display panel 12a to display a list of values that can be selected. The operation panel 12 accepts an input to select one value from a plurality of displayed values. Note that it is possible to set all grades or all classes as the distribution target. FIG. 6 shows an example in which a second grade class B is set as the distribution target of the distribution material P. In this way, the operation panel 12 accepts the input of selecting the distribution target (the grade 44 and the class 45 of pupils) of the distribution material P.

The confidential mode setting screen 72 is provided with a distribution material title input box C1 for input a title of the distribution material P. When the display position of the distribution material title input box C1 is touched, the control unit 11 controls the display panel 12a to display a software keyboard. Characters, numbers, and symbols can be input using the software keyboard. The control unit 11 controls to display the title of the distribution material input by the software keyboard within the distribution material title input box C1. In addition, the input title of the distribution material can be used as a data name (file name) of the management data 4 (see FIG. 3).

Figure 7:
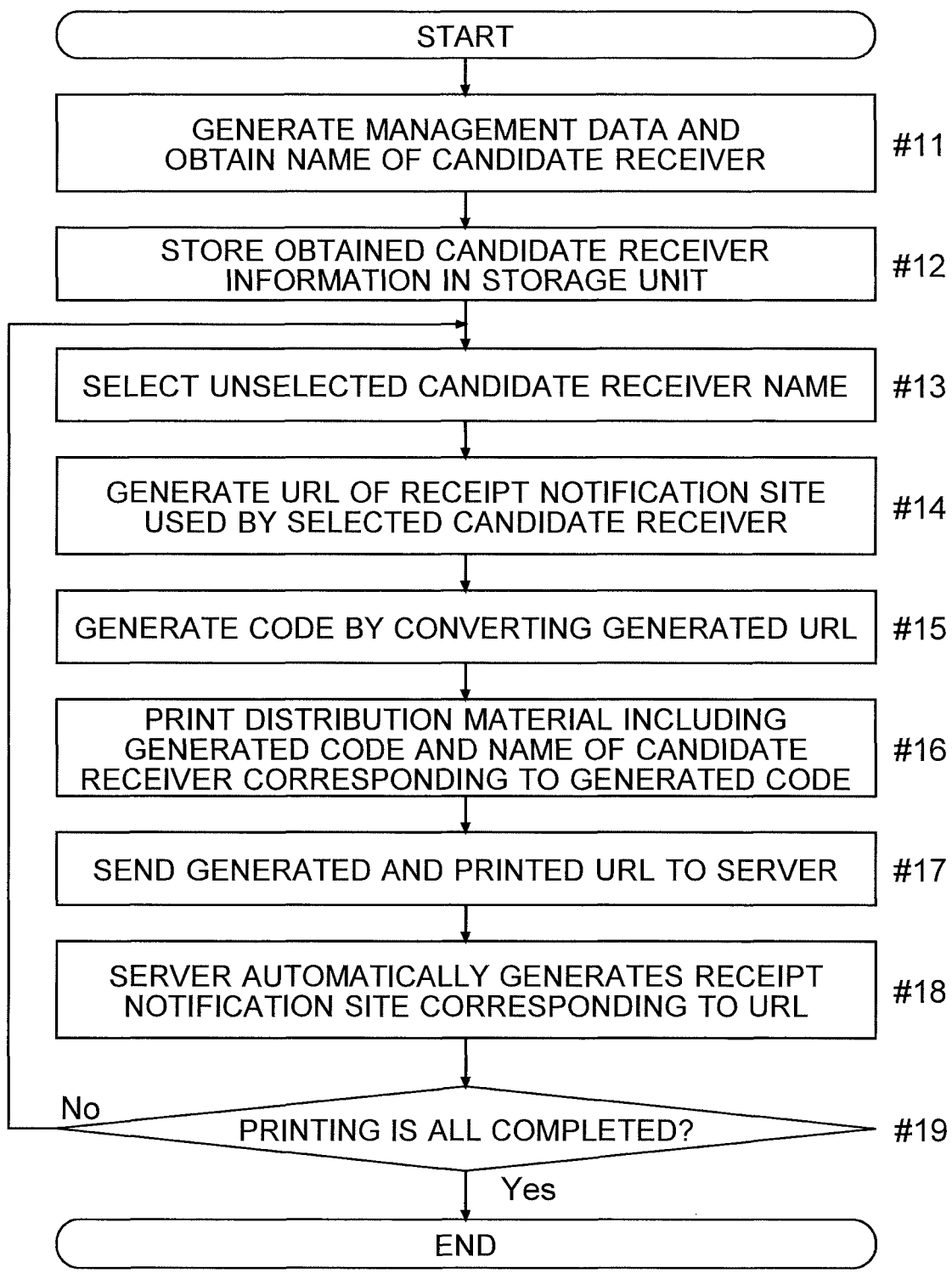
FIG. 7 is a diagram showing an example of a flow of printing in a confidential mode according to the embodiment.

A flowchart of FIG. 7 starts at a time point when printing in the confidential mode is instructed to start. First, the operation panel 12 accepts an operation to the confidential mode button B1. Next, setting in the confidential mode setting screen 72 is performed. After that, the start key (hardware key 12c) is operated. For example, in case of copying, the confidential mode button B1 is operated. Next, setting in the confidential mode setting screen 72 is performed. Next, a copy job (function) is selected in the home screen 71. Next, a document is set. Then, the start key is operated.

The server 2 generates the management data 4 according to the setting prior to printing in the confidential mode (step #11). After the management data 4 is generated, the multifunction peripheral 1 (communication unit 15) obtains the newly generated management data 4 (the name of candidate receiver 43) (step #11).

In step #11, the control unit 11 controls the communication unit 15 to transmit the requested (set) data of the grade 44, the class 45, and the title of the distribution material to the server 2. On the basis of the data received by the server communication unit 23, the server processing unit 21 narrows down data of the basic table DB to data of the row (person to whom distributed) corresponding to the set grade 44 and class 45. In other words, the server processing unit 21 extracts the data of the basic table DB. In this way, the grade 44 and the class 45 are used for narrowing down the data of the basic table DB.

The server processing unit 21 generates the management data 4 by adding predetermined items (blanks) to the extracted ID 41, the name of person to whom distributed 42, the name of candidate receiver 43, the grade 44, the class 45, and the reference 48 (step #11). The predetermined items are three items of the receipt notification record 46, the comment 47, and the notification date and time 49. The generated management data 4 corresponds to the distribution material P to be printed in the confidential mode. In addition, the server processing unit 21 sets the data name (file name) of the management data 4, which is the set title of the distribution material and the print date of the distribution material P (see FIG. 3).

The server processing unit 21 allows the server communication unit 23 to transmit a part or a whole of the management data 4 (name of candidate receiver 43) to the communication unit 15. In this way, the control unit 11 obtains the name of candidate receiver 43 corresponding to the person to whom distributed based on the newly generated management data 4 (step #11). The control unit 11 may control the communication unit 15 to obtain information such as the grade 44, the class 45, the name of person to whom distributed 42 (name of pupil), together with the name of candidate receiver 43.

The control unit 11 controls the storage unit 16 to store the obtained management data 4 (name of candidate receiver 43) (step #12). The control unit 11 selects an unselected candidate receiver (name of candidate receiver 43) among the candidate receivers (step #13). The control unit 11 generates a URL of a receipt notification site 8 (step #14). The receipt notification site 8 is used by the selected candidate receiver. The receipt notification site 8 is a site that is being set in the server 2. The receipt notification site 8 is a site for notifying that the candidate receiver of the distribution material P has actually received the distribution material P. The server 2 may generate the receipt notification site 8 for each name of candidate receiver 43 and for each distribution material P. In this case, the control unit 11 generates different URLs for individual names of candidate receiver 43 and for individual distribution materials P. Note that details of contents of the receipt notification site 8 and operation using the communication device 5 will be described later.

Next, the control unit 11 generates the code 6 (step #15). The control unit 11 generates the code 6 by converting the generated URL of the receipt notification site 8. This embodiment describes an example in which a QR code (two-dimensional code 6) is generated as the code 6. Note that the generated code 6 is not limited to the QR code. It may be any code 6 that can be read by the communication device 5.

The control unit 11 controls the printer unit 14 to print the distribution material P including the generated code 6 and the name of candidate receiver 43 corresponding to the generated code 6 (name of candidate receiver 43 corresponding to the URL of the code 6) (step #16).

Note that the distribution material P has an embedded space P1. The embedded space P1 is a space in which the name of candidate receiver 43 and the code 6 are printed. For example, the embedded space P1 is a head area having a certain width on the first page of the document. In case of copying, a blank is disposed in advance in the document. The blank may be the embedded space P1. In addition, the control unit 11 may process the image data to be used for printing (image data of the document in case of copying) so as to generate the space P1. In this case, the control unit 11 shifts positions of pixels of the original image data so as to generate the embedded space P1. The control unit 11 generates the image data containing the name of candidate receiver 43 and the code 6 in the embedded space P1. The control unit 11 controls the printer unit 14 to perform printing based on the image data generated by the control unit 11.

Figure 8:
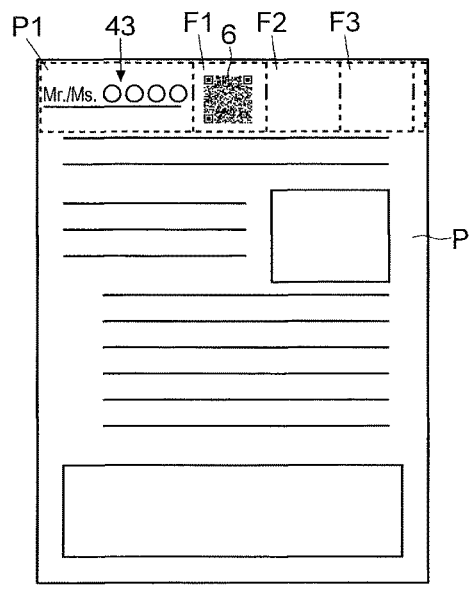
FIG. 8 is a diagram showing an example of a distribution material printed in the confidential mode.
Figure 9:
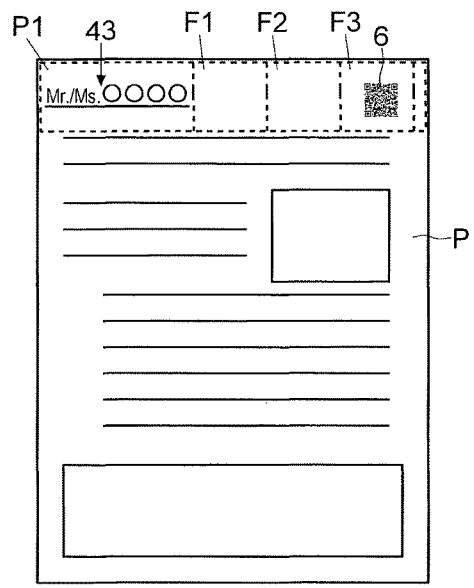
FIG. 9 is a diagram showing an example of the distribution material printed in the confidential mode.

FIGS. 8 and 9 show examples of the distribution material P printed in the confidential mode. As shown in FIGS. 8 and 9, the name of candidate receiver 43 and the code 6 (QR code) are printed on the distribution material P. The distribution material P is distributed to persons to whom distributed corresponding to the candidate receivers.

The control unit 11 may change size of the code 6 to be printed according to the significance set on the confidential mode setting screen 72. FIG. 8 shows an example in which the set significance is large (the "large" button B4 is operated), and hence the code 6 is printed in a larger size than that when the significance is medium or small. FIG. 9 shows an example in which the set significance is small (the "small" button B2 is operated), and hence the code 6 is printed in a smaller size than that when the significance is large or medium.

A position of the printed code 6 may be changed according to the significance set in the confidential mode setting screen 72. In this case, the position of printing the code 6 is determined in advance. FIGS. 8 and 9 show examples in which a blank area on the right side of the name of the candidate receiver 43 is divided into three areas. Among the divided areas, a leftmost area F1 is an area in which the code 6 is printed when the significance is large. A middle area F2 is an area in which the code 6 is printed when the significance is medium. A rightmost area F3 is an area in which the code 6 is printed when the significance is small. The three areas in which the code 6 is printed are also arranged in order of large, medium, and small.

Using a first check box a1 disposed in the confidential mode setting screen 72, it is possible to set whether or not to change the size of the code 6 to be printed according to the significance. Using a second check box a2 disposed in the confidential mode setting screen 72, it is possible to set whether or not to change the position according to the significance.

FIG. 8 shows an example in which the set significance is large (the "large" button B4 is operated), and hence the control unit 11 controls the printer unit 14 to print the code 6 in the area F1 corresponding to large significance. FIG. 9 shows an example in which the set significance is small, and hence the control unit 11 controls the printer unit 14 to print the code 6 in the area F3 corresponding to small significance.

The control unit 11 controls the communication unit 15 to transmit the generated URL (URL printed as the code 6) to the server 2 (step #17). The server processing unit 21 automatically generates the receipt notification site 8 based on the received URL (step #18). The server processing unit 21 enables to directly link (access) the URL corresponding to the decoded code 6. When the access to the URL corresponding to the code 6 is made, the server processing unit 2 controls to display the corresponding receipt notification site 8 (page display data D1). The receipt notification site 8 is a site supporting the distribution material P printed in step #16 and its candidate receiver. In this way, the server processing unit 2 generates the receipt notification site 8 (page display data D1).

For example, the control unit 11 may generate a URL using distribution date of the distribution material P, the title of the distribution material, the name of candidate receiver 43 as a path. In this case, the server processing unit 21 automatically generates the receipt notification site 8 of the path corresponding to the URL received from the multifunction peripheral 1 (step #18). In addition, the control unit 11 may generate the URL at random. In this case, the control unit 11 attaches data indicating the distribution date of the distribution material P, the title of the distribution material, and the name of candidate receiver 43 to the URL to be transmitted to the server 2. In this way, the type of the distribution material P corresponding to the URL and the candidate receiver can be sent to the server 2. The server processing unit 21 generates the receipt notification site 8 based on the URL and data received from the multifunction peripheral 1.

The control unit 11 checks whether or not printing of the whole distribution material P in the confidential mode is finished (step #19). In other words, the control unit 11 checks whether or not there is any one of obtained names of candidate receiver 43 for whom the distribution material P is not printed. In case where the whole distribution material is not printed (No in step #19), the flow returns to step #13. When the printing of the whole distribution material is completed (Yes in step #19), this flow is finished (END).

Receipt Notification Using Communication Device 5

Figure 10:
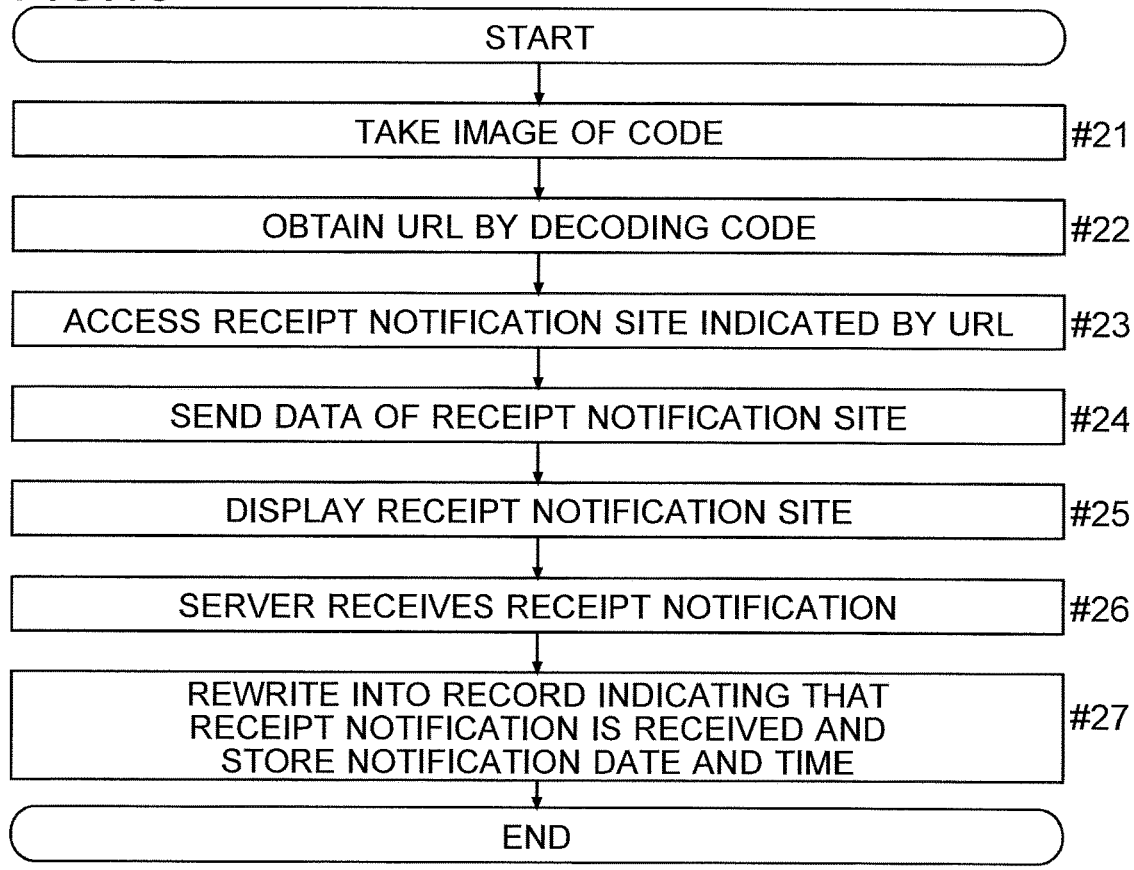
FIG. 10 is a flowchart showing an example of a flow of a receipt notification process in the image forming system according to the embodiment.
Figure 11:
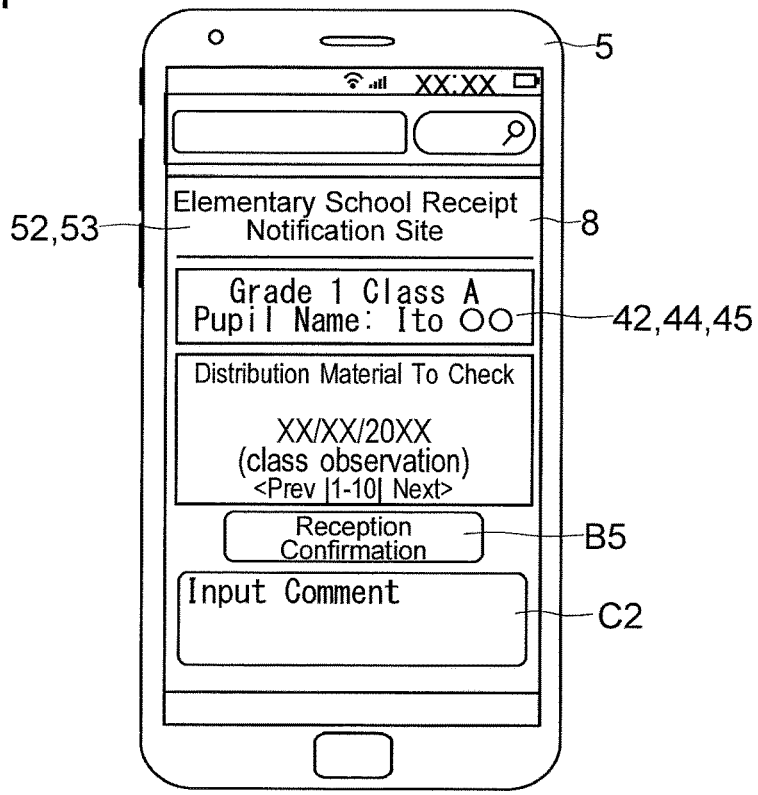
FIG. 11 is a diagram showing an example of a receipt notification site according to the embodiment.

Next, with reference to FIGS. 10 and 11, an example of a flow of a receipt notification process in the image forming system 100 according to the embodiment is described. The candidate receiver that has received the distribution material P can transmit the receipt notification using the communication device 5. The receipt notification is a notification to the server 2 indicating that the distribution material P is received. On the basis of the receipt notification, it is possible to know whether or not the candidate receiver has received the distribution material P.

A flowchart of FIG. 10 starts at a time point when the candidate receiver starts to transmit the receipt notification. When making the receipt notification, first an image of the code 6 attached to the distribution material P is taken by the imaging unit 55 of the communication device 5 (step #21). The processing unit 50 of the communication device 5 decodes the code 6 based on the image data obtained by imaging. Then, the processing unit 50 obtains the URL (step #22). Further, the processing unit 50 controls the wireless communication unit 56 to access the receipt notification site 8 of the server 2 indicated by the URL (step #23).

The server processing unit 21 controls the server communication unit 23 to transmit data necessary for displaying the receipt notification site 8 of the candidate receiver to the communication device 5 that has accessed (step #24). For example, server processing unit 21 controls the server communication unit 23 to transmit a site name, the title of the distribution material for which the receipt notification is being received, and the name of person to whom distributed 42.

In this case, the server 2 may control the server communication unit 23 to transmit data for displaying a reception confirmation button B5 (image data of the reception confirmation button B5 and data indicating a position thereof) to the communication device 5, so that reception confirmation can be easily performed.

The processing unit 50 of the communication device 5 activates a web browser (application for browsing sites). The processing unit 50 controls the display to display the receipt notification site 8 (step #25). FIG. 11 shows an example of the communication device 5 and the receipt notification site 8 displayed on the communication device 5.

It is possible to generate the site every time when the code 6 is printed (for each type of the distribution material P and for each candidate receiver). In this case, as shown in FIG. 11, the name of person to whom distributed 42, the grade 44, and the class 45, which correspond to the candidate receiver who has accessed (the URL used for the access) may be displayed in the receipt notification site 8. In addition, as shown in FIG. 11, the type of the distribution material P for which receipt is being notified to the server 2 may be described. In addition, the server processing unit 21 controls the display 52 to display the reception confirmation button B5.

To transmit the receipt notification, the user operates the reception confirmation button B5. The receipt notification site 8 is configured so that when the reception confirmation button B5 is operated, the communication device 5 notifies the server 2 that the reception confirmation button B5 is operated. In other words, when the reception confirmation button B5 is operated, the processing unit 50 of the communication device 5 controls the wireless communication unit 56 to transmit operation notification of the reception confirmation button B5 to the server communication unit 23.

The receipt notification site 8 may be configured so that user's comment can be input. To input the comment 47, the receipt notification site 8 is provided with a comment input box C2. When the comment input box C2 is touched, the processing unit 50 controls to display the software keyboard. The processing unit 50 controls to display the comment 47 input by the software keyboard in the comment input box C2.

When the reception confirmation button B5 is operated in the state where the comment 47 is input in the comment input box C2, the processing unit 50 of the communication device 5 controls to transmit the notification with the input comment 47 to the server communication unit 23.

The server communication unit 23 receives from the communication device 5 the notification that the reception confirmation button B5 is operated. The server processing unit 21 regards the notification as the receipt notification. In other words, the server 2 receives the receipt notification from the communication device 5 (step #26). When receiving the receipt notification, the server processing unit 21 controls the server storage unit 22 to rewrite the receipt notification record 46 in the field corresponding to the sender of the receipt notification (rewrite into a record indicating that the receipt notification is received) (step #27). In addition, the server processing unit 21 controls the server storage unit 22 to store the notification date and time 49 (step #27). Then, this flow is finished (END). The date and time information can be obtained from a clock circuit (clock, not shown) mounted in the server processing unit 21.

The management data 4 is provided with a field for recording presence or absence of the receipt notification for each person to whom distributed (candidate receiver) (see FIG. 3, an item of the receipt notification record 46). On the basis of the receipt notification site 8 in which the reception confirmation button B5 is operated, the server processing unit 21 selects the management data 4 corresponding to the distribution material P for which the receipt notification is performed among individual management data 4. The server processing unit 21 writes data indicating received in the field of the receipt notification (the receipt notification record 46) corresponding to the candidate receiver who notified reception in the selected management data 4. A symbol "○" is written in the example of FIG. 3. It may be a character or a symbol other than "○". Note that the field of the receipt notification may be blank until the receipt notification is received.

In this way, the server storage unit 22 stores the receipt notification record 46, which is a record of the candidate receiver that made the receipt notification, as the management data 4. When the communication device 5 transmits the receipt notification via the receipt notification site 8, the server processing unit 21 rewrites the receipt notification record 46 corresponding to the candidate receiver into the record indicating that the receipt notification is received.

In addition, the management data 4 is provided with an item of the notification date and time 49. When receiving the receipt notification, the server processing unit 21 selects the management data 4 corresponding to the distribution material P for which the receipt notification is received. The server processing unit 21 controls to write data of date and time when the receipt notification is received in the field of the notification date and time 49 corresponding to the candidate receiver who has made the receipt notification.

As described above, the management data 4 is provided with an item of the comment 47. When the input comment 47 is attached to the receipt notification by the communication device 5, the server processing unit 21 adds the attached comment 47 to a field of the comment 47 corresponding to the candidate receiver who has sent the receipt notification. In this way, opinions and requests of individual candidate receivers are added to the management data 4. In other words, the server processing unit 21 adds contents of the comment written in the comment input box C2 to the field of the comment 47.

Inquiry to Person Who Has Not Sent Receipt Notification

Figure 13:
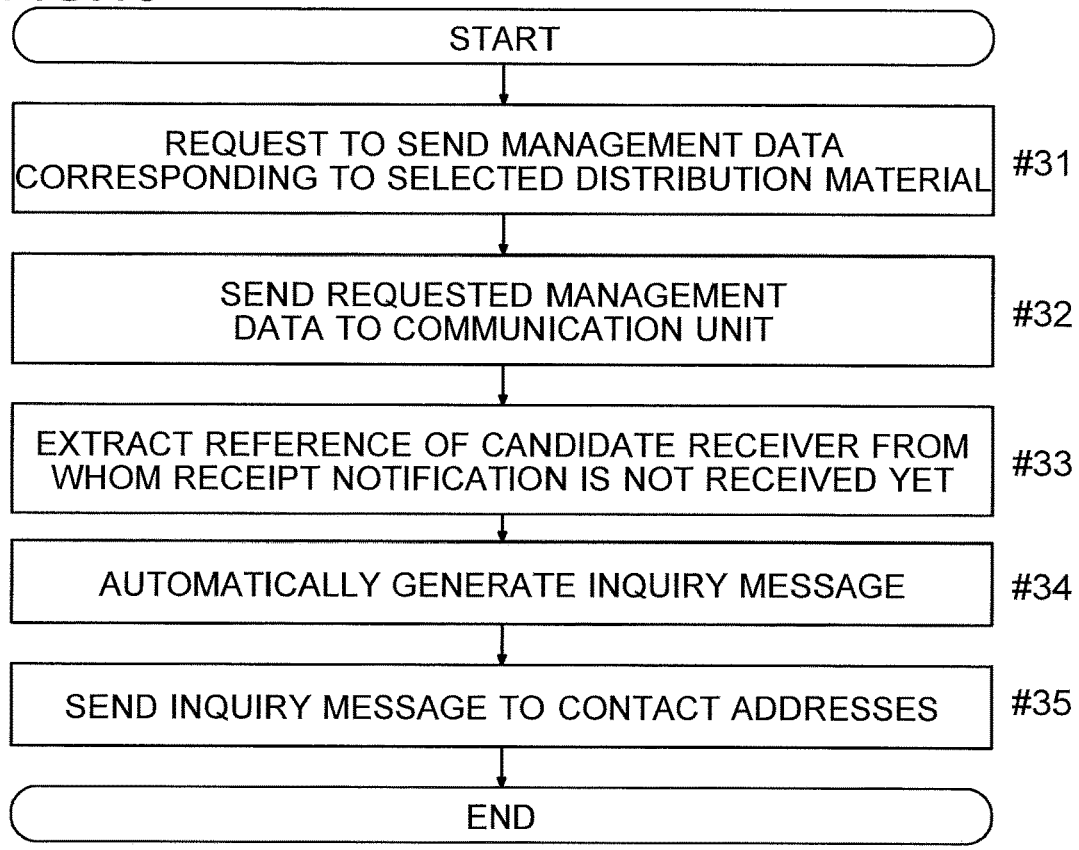
FIG. 13 is a flowchart showing an example of a flow of an inquiry to a person who has not sent the receipt notification in the image forming system according to the embodiment.

Next, with reference to FIGS. 12 and 13, an inquiry to a person who has not sent the receipt notification in the image forming system 100 according to the embodiment is described. In the image forming system 100, the multifunction peripheral 1 can send the inquiry whether or not the distribution material P is received. For example, the inquiry is sent to the candidate receiver from whom the receipt notification is not received yet. Setting about the inquiry can be performed in a distribution material management menu screen 73.

When a predetermined operation is performed to the operation panel 12, the control unit 11 controls the operation panel 12 to display the distribution material management menu screen 73. The distribution material management menu screen 73 includes an inquiry button B6. When the inquiry button B6 is operated, the control unit 11 controls the communication unit 15 to transmit the inquiry of the selected distribution material P.

In the distribution material management menu screen 73, the distribution material P can be selected. As shown in FIG. 12, the control unit 11 controls to display a list of the distribution materials printed before in the confidential mode (distribution material list 73a) in the distribution material management menu screen 73. The control unit 11 controls to display a document ID, the print date, the title of the distribution material, and the distribution target, for each distribution material P in the distribution material list 73a. The document ID is automatically assigned to each distribution material P. The print date is actual print date in the confidential mode. The title of the distribution material is a title input on the confidential mode setting screen 72. The distribution target is also set in the confidential mode setting screen 72. For display of the distribution material list 73a, when printing in the confidential mode, the control unit 11 controls to store information (data) of the print date, the set title of the distribution material P, and the set distribution target in the storage unit 16 in a non-volatile manner. On the basis of this storing in the storage unit 16, the control unit 11 controls to display the distribution material list 73a. The operation panel 12 accepts an operation of touching a row of the distribution material P to be inquired as an operation for selecting the distribution material P (see FIG. 12).

Note that in order to narrow down the distribution material P, the distribution material management menu screen 73 is provided with a third pull-down menu m3 and a fourth pull-down menu m4. When each pull-down menu is touched, the control unit 11 controls the display panel 12a to display selectable values as a list. The operation panel 12 accepts an input for selecting one value from a plurality of displayed values. In this way, the operation panel 12 accepts an input for narrowing down the distribution material P to be displayed in the distribution material list 73a. In addition, the operation panel 12 accepts an input for selecting the distribution material P.

Further, a flow of FIG. 13 starts at a time point when the inquiry button B6 is operated after the distribution material P is selected on the distribution material management menu screen 73. In other words, it is a time point when an instruction to contact with the candidate receiver, from which the receipt notification is not received, is issued with the operation panel 12.

The control unit 11 controls the communication unit 15 to transmit to the server 2 a request to send the management data 4 corresponding to the selected distribution material P (step #31). In this case, in order to specify the management data 4, the control unit 11 attaches to the request the data indicating the selected title of the distribution material P, the distribution target, and the print date.

The server communication unit 23 receives the request. The server processing unit 21 selects the management data 4 matching the request. The server processing unit 21 controls the server communication unit 23 to transmit the selected management data 4 (the receipt notification record 46 and the reference 48) (step #32).

As described above, the reference 48 of each candidate receiver is included in the management data 4. The control unit 11 extracts the reference 48 of the candidate receiver from whom the receipt notification is not received yet, from the obtained management data 4, based on the obtained receipt notification record 46 (step #33). Specifically, the control unit 11 extracts the reference 48 of the same row as the field of the receipt notification that is not marked with the symbol "○" in the management data 4.

The control unit 11 automatically generates the inquiry message (step #34). The control unit 11 generates the inquiry message using the selected distribution date of the distribution material P and the title of the distribution material P. For example, control unit 11 generates the inquiry message such as "Have you read the printout about **** delivered on mm/dd?" The control unit 11 embeds information such as the selected distribution date of the distribution material P and the name into the message.

The control unit 11 controls the communication unit 15 to transmit the inquiry message to the extracted contact address (step #35). Then, this flow is finished (END). Note that when the contact address is an electronic mail address, the communication unit 15 transmits the inquiry by electronic mail. When the contact address is a facsimile number, the communication unit 15 transmits the inquiry by facsimile.

Printing of Status List 91

Figure 14:
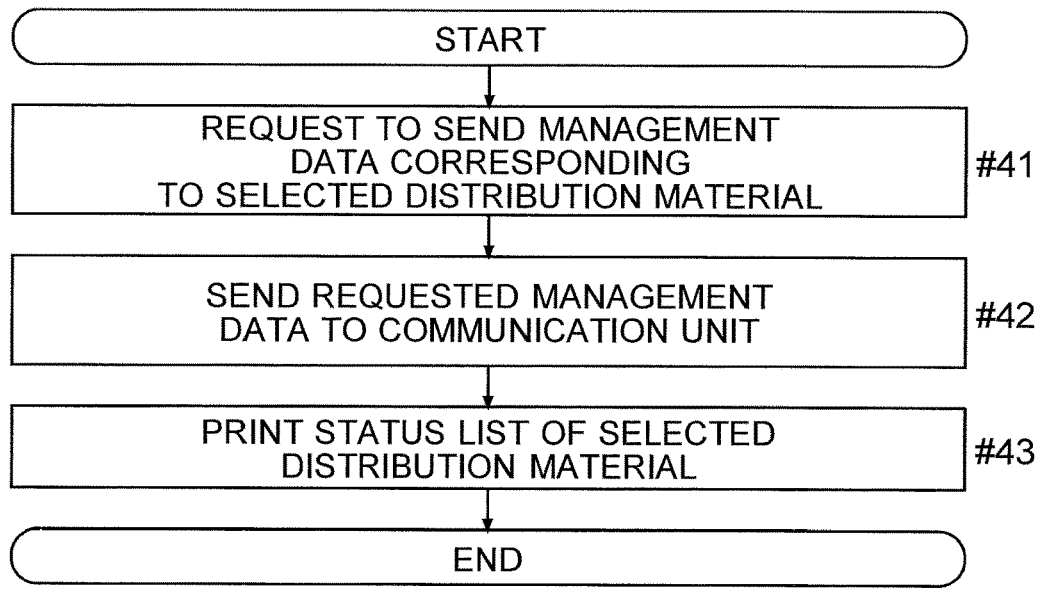
FIG. 14 is a flowchart showing an example of a flow of printing a status list in the image forming system according to the embodiment.

Next, with reference to FIGS. 14 and 15, printing of a status list 91 in the image forming system 100 according to the embodiment is described. The multifunction peripheral 1 can print the status list 91 of the receipt notification about the distribution material P. The status list 91 is a document (list table) for checking from which candidate receiver the receipt notification is received and from which candidate receiver the receipt notification is not received for the distribution material P. The status list 91 describes the candidate receivers of the selected distribution material P and a reception status of the receipt notification for each candidate receiver. By checking the status list 91, the candidate receiver who has not received the distribution material P can be known at a glance.

To print the status list 91, the user operates a status list print button B7. The status list print button B7 is included in the distribution material management menu screen 73. When the status list print button B7 is operated (when printing of the status list 91 is instructed), the control unit 11 controls the printer unit 14 to print the status list 91 of the selected distribution material P. The distribution material P can be selected on the distribution material management menu screen 73. This is the same as transmission of the inquiry.

Further, a flow of FIG. 14 starts at a time point when the status list print button B7 is operated after the distribution material P is selected. The control unit 11 controls the communication unit 15 to transmit to the server 2 a request to send the management data 4 corresponding to the selected distribution material P (step #41). In this case, in order to specify the management data 4, the control unit 11 attaches to the request the data indicating the selected title of the distribution material P, the distribution target, and the print date.

The server communication unit 23 receives the request. The server processing unit 21 selects the management data 4 matching the request. The server processing unit 21 controls the server communication unit 23 to transmit the selected management data 4 (the name of candidate receiver 43 and the receipt notification record 46) to the communication unit 15 (step #42).

On the basis of the obtained name of candidate receiver 43 and the receipt notification record 46, the control unit 11 controls the printer unit 14 to print the status list 91 (step #43). Specifically, the control unit 11 generates image data of the status list 91 based on the received name and each information. The control unit 11 controls the printer unit 14 to print based on the generated image data. Then, this flow is finished.

The management data 4 is like a table, and hence the control unit 11 controls the printer unit 14 to print the table as the status list 91. The table includes a field of the candidate receiver and a field of the receipt notification record 46 of the receipt notification corresponding to the candidate receiver, which are arranged in a row direction. FIG. 15 shows an example of the printed status list 91. This status list 91 includes each name of candidate receiver 43 and the receipt notification record 46 of the receipt notification (presence or absence of the symbol "∘"), the selected title of the distribution material P, the name of person to whom distributed 42 (name of pupil) corresponding to each candidate receiver (guardian), the grade 44 and the class 45 of the person to whom distributed.

Printing of Date and Time List 92

Next, with reference to FIGS. 16 and 17, printing of a date and time list 92 in the image forming system 100 according to the embodiment is described.

The multifunction peripheral 1 can print the date and time list 92. The date and time list 92 is a list of the notification date and time 49 when the receipt notification is received. It is a document for checking a period of time after the distribution material P is delivered until the receipt notification is received. The date and time list 92 describes the candidate receiver of the selected distribution material P and the notification date and time 49 of each candidate receiver. By checking the date and time list 92, it is possible to check quickness of response of each candidate receiver. For example, it is possible to know which guardian responds quickly and which guardian respond relatively slowly.

To print the date and time list 92, the user operates a date and time list print button B8 included in the distribution material management menu screen 73. When the date and time list print button B8 is operated (when printing of the date and time list 92 is instructed), the control unit 11 controls the printer unit 14 to print the date and time list 92 of the selected distribution material P. The distribution material P can be selected on the distribution material management menu screen 73. This is the same as the transmission of the inquiry or the printing of the status list 91.

Further, a flow of FIG. 16 starts at a time point when the date and time list print button B8 is operated after the distribution material P is selected on the distribution material management menu screen 73. The control unit 11 controls the communication unit 15 to transmit to the server 2 a request to send the management data 4 corresponding to the selected distribution material P (step #51). In this case, in order to specify the management data 4, the control unit 11 attaches to the request the data indicating the selected title of the distribution material P, the distribution target, and the print date.

The server communication unit 23 receives the request. The server processing unit 21 selects the management data 4 matching the request. The server processing unit 21 controls the server communication unit 23 to transmit the selected management data 4 (the name of candidate receiver 43 and the notification date and time 49) (step #52).

On the basis of the obtained name of candidate receiver 43 and the notification date and time 49, the control unit 11 controls the printer unit 14 to print the date and time list 92 (step #43). The control unit 11 generates image data of the date and time list 92 based on the received name and each information. The control unit 11 controls the printer unit 14 to print based on the generated image data of the date and time list 92. Then, this flow is finished.

The management data 4 is like a table, and hence the control unit 11 controls the printer unit 14 to print the list table as the date and time list 92. The list table is a table in which a field of each candidate receiver and a field of the notification date and time 49 are arranged in the row direction. As to the candidate receiver from which the notification is not received, the field of the notification date and time 49 is vacant. FIG. 17 shows an example of the date and time list 92. This date and time list 92 includes each name of candidate receiver 43, the notification date and time 49, the selected title of the distribution material P, and the name of person to whom distributed 42 (name of pupil) corresponding to each candidate receiver (guardian), the grade 44 and the class 45 of the person to whom distributed.

In this way, the image forming system 100 according to the embodiment includes the image forming apparatus (multifunction peripheral 1) and the server 2. The server 2 stores the management data 4, which defines the name of person to whom distributed 42 as a name of the person to whom distributed of the distribution material P and the name of candidate receiver 43 as a name of the candidate receiver who should receive the distribution material P via the person to whom distributed. The image forming apparatus includes the operation panel 12, the communication unit 15, the printer unit 14, the storage unit 16, and the control unit 11. The operation panel 12 accepts the instruction to print in the confidential mode. The printer unit 14 performs printing. The communication unit 15 communicates with the server 2.

The storage unit 16 stores data. The control unit 11 controls the communication unit 15 to obtain the name of candidate receiver 43 from the server 2 and controls the storage unit 16 to store the obtained name of candidate receiver 43. When the printing in the confidential mode is instructed with the operation panel 12, the control unit 11 generates the code 6 that can be decoded by the communication device 5. The code 6 is obtained by converting the URL of the receipt notification site 8 that is set in the server 2 and is a site for notifying that the candidate receiver of the distribution material P has actually received the distribution material P. The control unit 11 controls the printer unit 14 to print the distribution material P including the generated code 6 and the name of candidate receiver corresponding to the generated code 6.

The person to whom the distribution material P is actually handed (candidate receiver) reads the code 6 so as to access the receipt notification site 8. Only by accessing, the receipt notification can be easily made to a distributor. In addition, on the basis of presence or absence of the receipt notification from the communication device 5, the distributor can easily check whether or not each candidate receiver has actually received the distribution material P.

The server 2 stores the receipt notification record 46 as the management data 4. The receipt notification record 46 is a record of the candidate receiver from whom the receipt notification is received. The receipt notification is a notification indicating that the distribution material P is received, via the receipt notification site 8. When receiving the receipt notification from the communication device 5 via the receipt notification site 8, the receipt notification record 46 corresponding to the candidate receiver who has sent the receipt notification is rewritten into a record indicating that the receipt notification is received. In this way, on the basis of the receipt notification record 46, the candidate receiver who has made the receipt notification and the candidate receiver who has not made the receipt notification can be easily separated from each other. In addition, on the basis of the data (receipt notification record 46), the candidate receiver who has not made the receipt notification can be easily narrowed down.

When the receipt notification site 8 is accessed, the server 2 sends data for displaying the reception confirmation button B5 to the communication device 5. The server 2 regards the notification from the communication device 5 indicating that the reception confirmation button B5 is operated as the receipt notification. In this way, the receiver of the distribution material P can make the receipt notification only by operating the reception confirmation button B5.

When the comment 47 input by the communication device 5 is attached to the receipt notification, the server 2 stores the attached comment 47. In this way, the distributor can easily check the comment 47 such as request or inquiry from the candidate receiver.

The server 2 stores the reference 48 of each candidate receiver as the management data 4. When an inquiry instruction for inquiring the candidate receiver from whom the receipt notification is not received yet is made with the operation panel 12, the communication unit 15 obtains from the server 2 the receipt notification record 46 and the reference 48 of each candidate receiver. On the basis of the obtained receipt notification record 46 and the reference 48, the control unit 11 controls the communication unit 15 to transmit the inquiry indicating that the receipt notification is not received yet to the reference 48 of the candidate receiver from whom the receipt notification is not received yet. In this way, it is possible to inform the candidate receiver who has not received the distribution material P that there is the distribution material P. In other words, it is possible to inform the candidate receiver that the distribution material P is failed to be received. As a result, the candidate receiver tells the person to whom distributed to hand the distribution material P and receives the distribution material P from the person to whom distributed. Thus, information transmission failure to each candidate receiver is eliminated.

When printing instruction of the status list 91 is made with the operation panel 12, the communication unit 15 obtains the name of candidate receiver 43 and the receipt notification record 46 of each candidate receiver from the server 2. The status list 91 includes the name of candidate receiver 43 and the reception status of the receipt notification from each candidate receiver. On the basis of the obtained name of candidate receiver 43 and the receipt notification record 46, the control unit 11 controls the printer unit 14 to print the status list 91. In this way, it is possible to easily obtain the list table of the candidate receivers who have checked the distribution material P and have sent the receipt notification and the candidate receivers who have not sent the receipt notification yet. The distributor should inquire only the candidate receivers who have not sent the receipt notification by telephone or email. It is not necessary to inquire all the candidate receivers for confirmation unlike conventional methods.

The server 2 stores the notification date and time 49 when the receipt notification is received from the candidate receiver as the management data 4. When printing instruction of the date and time list 92 is made with the operation panel 12, the communication unit 15 obtains the name of candidate receiver 43 and the notification date and time 49 from the server 2. The date and time list 92 includes the notification date and time 49 when each candidate receiver made the receipt notification. On the basis of the obtained name of candidate receiver 43 and the notification date and time 49, the control unit 11 controls the printer unit 14 to print the date and time list 92. In this way, it is possible to obtain statistical data (a document) for discriminating the candidate receiver who sent the receipt notification in a short time (responded quickly) from other candidate receivers.

The operation panel 12 accepts setting of significance of the distribution material P. The control unit 11 prints the code 6 in a certain size or larger. The control unit 11 controls the printer unit 14 to print the code 6 in a larger size as the significance set with the operation panel 12 is larger. In this way, it is possible to show a significance level of the distribution material P as a size of the code 6 to the person to whom distributed and the candidate receiver. The person to whom distributed can have a large attention to the distribution material P having a high significance. It is possible to prevent the distribution material P having a high significance from being failed to be handed.

A position of printing the code 6 is determined in advance according to the significance. The control unit 11 controls the printer unit 14 to print the code 6 at a position according to the significance set with the operation panel 12. In this way, a significance level of the distribution material P can be shown to the person to whom distributed and the candidate receiver by the printing position of the code 6. The person to whom distributed can have a large attention to the distribution material P having a high significance. It is possible to prevent the distribution material P having a high significance from being failed to be handed.

In addition, the distribution material P is distributed to pupils. The operation panel 12 accepts the input of selecting the grade 44 and the class 45 of the pupil. When the grade 44 and the class 45 are selected with the operation panel 12 and the instruction to print in the confidential mode is made, the control unit 11 controls the printer unit 14 to print the distribution material P including the name of the guardian of the pupil of the grade 44 and the class 45 selected with the operation panel 12 and the code 6 corresponding to the guardian. In this way, it is possible to select the grade 44 and the class 45 for printing the distribution material P with the code 6.

In addition, the present disclosure can also be understood as a disclosure of the image forming apparatus. Specifically, the image forming apparatus (multifunction peripheral 1) according to the present disclosure includes the operation panel 12, the printer unit 14, the communication unit 15, the storage unit 16, and the control unit 11. The operation panel 12 accepts the instruction to print in the confidential mode. The printer unit 14 performs printing. The communication unit 15 performs communication between the image forming apparatus and the server 2 that stores the management data 4, which defines the name of person to whom distributed 42 as a name of the person to whom the distribution material P is distributed and the name of candidate receiver 43 as a name of the candidate receiver who should receive the distribution material P via the person to whom distributed. The storage unit 16 stores data. The control unit 11 controls the communication unit 15 to obtain the name of candidate receiver 43 from the server 2. The control unit 11 controls the storage unit 16 to store the obtained name of candidate receiver 43. When the instruction to print in the confidential mode is made with the operation panel 12, the control unit 11 generates the code 6 that can be decoded by the communication device 5. The code 6 is obtained by converting the URL of the receipt notification site 8 that is set in the server 2 and is a site for notifying that the candidate receiver of the distribution material P has actually received the distribution material P. The control unit 11 controls the printer unit 14 to print the distribution material P including the generated code 6 and the name of the candidate receiver corresponding to generated code 6. In the same manner as the image forming system 100 described above, it is possible to easily and readily check whether or not the distribution material P is received by the person who should receive it. Further, information transmission failure can be prevented.

In addition, although the embodiment of the present disclosure is described above, the scope of the present disclosure is not limited to this. The present disclosure can be implemented with various modifications within the scope of the present disclosure without deviating from the spirit thereof.

What is claimed is:

1. An image forming system comprising an image forming apparatus and a server that stores management data defining a name of person to whom distributed and a name of candidate receiver, wherein
the name of person to whom distributed is a name of a person to whom a distribution material is distributed,
the name of candidate receiver is a name of a person who should receive the distribution material via the person to whom distributed,
the image forming apparatus
accepts an instruction to print in a confidential mode,
obtains the name of candidate receiver from the server, stores the obtained name of candidate receiver,
generates a code that can be decoded by a communication device when the instruction to print in the confidential mode is made,
prints the distribution material including the generated code and the name of candidate receiver corresponding to the generated code,
accepts setting of significance of the distribution material, setting of whether or not to change a size of the printed code according to the significance, and setting of whether or not to change a printing position of the code according to the significance,
prints the code in a head area having a certain width on a first page,
when setting for changing the size of the printed code according to the significance has been done, prints the code in a larger size as the set significance is larger, and
when setting for changing the printing position of the code according to the significance has been done, prints the code in an area corresponding to the set significance and prints the code at a position closer to the name of candidate receiver as the significance is larger,
the code is obtained by converting a URL of a receipt notification site, and
the receipt notification site is a site set in the server, and is a site for notifying that the candidate receiver of the distribution material has actually received the distribution material.

2. The image forming system according to claim 1, wherein
the server stores a receipt notification record as the management data,
the receipt notification record is a record of the candidate receiver from whom receipt notification is received,
the receipt notification is a notification indicating that the distribution material is received, via the receipt notification site, and
when receiving the receipt notification from the communication device via the receipt notification site, the server rewrites the receipt notification record corresponding to the candidate receiver from whom the receipt notification is received into a record indicating that the receipt notification is received.

3. The image forming system according to claim 2, wherein when the receipt notification site is accessed, the server sends data for displaying a receipt notification button to the communication device, and regards a notification from the communication device indicating that the receipt notification button is operated as the receipt notification.

4. The image forming system according to claim 2, wherein when a comment input in the communication device is attached to the receipt notification, the server stores the attached comment.

5. The image forming system according to claim 2, wherein
the server stores a reference of the candidate receiver as the management data, and
the image forming apparatus accepts an inquiry instruction for inquiring the candidate receiver from whom the receipt notification is not received, obtains the receipt notification record and the reference of each candidate receiver from the server when accepting the inquiry instruction, and sends an inquiry indicating that the receipt notification is not received yet to the reference of the candidate receiver from whom the receipt notification is not received yet, based on the obtained receipt notification record and the reference.

6. The image forming system according to claim 5, wherein the image forming apparatus automatically generates an inquiry message indicating that the receipt notification is not received based on distribution date and a title of the distribution material.

7. The image forming system according to claim 2, wherein
the image forming apparatus accepts a printing instruction of a status list, obtains the name of candidate receiver and the receipt notification record of the candidate receiver from the server when accepting the printing instruction of the status list, and prints the status list based on the obtained name of candidate receiver and the receipt notification record, and
the status list includes the name of candidate receiver and a reception status of the receipt notification for each candidate receiver.

8. The image forming system according to claim 2, wherein
the server stores notification date and time when the receipt notification is received from the candidate receiver as the management data,
the image forming apparatus accepts a printing instruction of a notification date and time list, obtains the name of candidate receiver and the notification date and time from the server when accepting the printing instruction of the notification date and time list, and prints the notification date and time list based on the obtained name of candidate receiver and the notification date and time, and
the notification date and time list includes the notification date and time when each candidate receiver made the receipt notification.

9. The image forming system according to claim 1, wherein
the distribution material is distributed to pupils, and
the image forming apparatus accepts an input for selecting a grade and a class of a pupil, and prints the distribution material including a name of guardian of the pupil of the grade and the class selected with the operation panel and the code corresponding to the guardian when the grade and the class are selected and the instruction to print in the confidential mode is made.

10. The image forming system according to claim 1, wherein when printing the distribution material, the image forming apparatus generates image data containing an embedded space by shifting positions of pixels of the image data, and prints the name of candidate receiver and the code in the embedded space.

11. The image forming system according to claim wherein the code is a two-dimensional code.

12. An image forming apparatus comprising:
an operation panel for accepting an instruction to print in a confidential mode;
a printer unit for performing printing;
a communication unit for communicating with a server that stores management data defining a name of person to whom distributed and a name of candidate receiver;
a storage unit for storing data; and
a control unit configured to control the communication unit to obtain the name of candidate receiver from the server, to control the storage unit to store the obtained name of candidate receiver, to generate a code that can be decoded by a communication device when the instruction to print in the confidential mode is made with the operation panel, and to control the printer unit to print a distribution material including the generated code and the name of candidate receiver corresponding to the generated code, wherein the operation panel accepts setting of significance of the distribution material, setting of whether or not to change a size of the printed code according to the significance, and setting of whether or not to change a printinq position of the code accordinq to the significance,
the control unit
prints the code in a head area having a certain width on a first page,
when setting for changing the size of the printed code according to the significance has been done, makes the printer unit print the code in a larger size as the set significance is larger, and
when setting for changing the printing position of the code according to the significance has been done, prints the code in an area corresponding to the set significance and makes the printer unit print the code at a position closer to the name of candidate receiver as the significance is larger,
the name of person to whom distributed is a name of a person to whom the distribution material is distributed,
the name of candidate receiver is a name of a person who should receive the distribution material via the person to whom distributed,
the code is obtained by converting a URL of a receipt notification site, and
the receipt notification site is a site set in the server, and is a site for notifying that the candidate receiver of the distribution material has actually received the distribution material.

13. The image forming apparatus according to claim 12, wherein the code is a two-dimensional code.

14. A method for controlling an image forming system, the method comprising:
allowing the server to store management data defining a name of person to whom distributed and a name of candidate receiver, the name of person to whom distributed being a name of a person to whom a distribution material is distributed, the name of candidate receiver being a name of a person who should receive the distribution material via the person to whom distributed;
allowing the image forming apparatus to accept an instruction to print in a confidential mode;
allowing the image forming apparatus to perform printing;
allowing the image forming apparatus to obtain the name of candidate receiver from the server;
allowing the image forming apparatus to store the obtained name of candidate receiver;
allowing the image forming apparatus to generate a code that can be decoded by a communication device when the instruction to print in the confidential mode is made; and
allowing the image forming apparatus to print the distribution material including the generated code and the name of candidate receiver corresponding to the generated code,
accepting setting of significance of the distribution material, setting of whether or not to change a size of the printed code according to the significance, and setting of whether or not to change a printing position of the code according to the significance,
printing the code in a head area having a certain width on a first page, when setting for changing the size of the printed code according to the significance has been done, printing the code in a larger size as the set significance is larger, when setting for changing the printing position of the code according to the significance has been done, printing the code in an area corresponding to the set significance and printing the code at a position closer to the name of candidate receiver as the significance is larger, the code being obtained by converting a URL of a receipt notification site, the receipt notification site being a site disposed in the server and a site for notifying that the candidate receiver of the distribution material has actually received the distribution material.

15. The method according to claim 14, wherein the code is a two-dimensional code.

* * * * *